Nov. 23, 1965 V. F. ZAHODIAKIN 3,219,085

UTILITY MOUNT ASSEMBLY

Filed Sept. 25, 1964 3 Sheets-Sheet 1

INVENTOR.
VICTOR F. ZAHODIAKIN
BY John N. Bain
ATTORNEY.

Nov. 23, 1965 V. F. ZAHODIAKIN 3,219,085
UTILITY MOUNT ASSEMBLY
Filed Sept. 25, 1964 3 Sheets-Sheet 2

INVENTOR.
VICTOR F. ZAHODIAKIN
BY John N. Bain
ATTORNEY.

Nov. 23, 1965     V. F. ZAHODIAKIN     3,219,085
UTILITY MOUNT ASSEMBLY
Filed Sept. 25, 1964     3 Sheets-Sheet 3

INVENTOR.
VICTOR F. ZAHODIAKIN
BY Howard P. King
ATTORNEY.

United States Patent Office 3,219,085
Patented Nov. 23, 1965

3,219,085
UTILITY MOUNT ASSEMBLY
Victor F. Zahodiakin, P.O. Box 689, Summit, N.J.
Filed Sept. 25, 1964, Ser. No. 407,948
11 Claims. (Cl. 151—41.75)

This application is a continuation-in-part of prior applications Serial No. 233,801, filed Oct. 29, 1962 and Serial No. 245,824 filed Dec. 19, 1962 both of which are now abandoned.

This invention relates to mounts generally, and more specifically to detachable utility mount assemblies adapted for both blind and accessible flush installations.

There are literally an inexhaustable number of applications for a utility mount assembly adapted to detachably secure any particular element to a generally flat surface, as for instance, nuts and other female receptacles both threaded and unthreaded, bolts, grommets, standards, pillars, pins, collars and the like. The present invention relates to a utility mount assembly which is adapted for rapid attachment and detachment to and from a generally flat surface from but one accessible side of a basal member when the installation is blind as to one side of such member, or from either side when the installation is accessible to both sides of the basal member.

In all industries, and in particular in the aircraft and missile industry, it is frequently necessary to secure structural members together. This may be done conveniently by means of a well-known quick-acting bolt and nut device. In such devices, either the nut or bolt or both are secured to the respective cooperative members. It is perhaps most common to attach the nut or female receptacle to the structural member and pass the bolt through a grommet mounted in the cooperative panel. In the past, the nut or female receptacle has been riveted directly to the structural member. While screws may be employed in some instances, they may be loosened by vibration and are therefore avoided if possible. However, both the rivet and screw expedients are frequently very difficult and time consuming to install when access to a structural member is limited on one or both sides. Another problem perhaps of greater importance when the stronger and more vibration resistant rivet is employed, is that attachment is essentially permanent. Should the female receptacle, nut or threads be damaged, the mount can only be removed by cutting the rivets or removing the section of the structural member to which the mount is secured. Such a procedure is both time consuming and costly. Moreover, in some instances, the entire structural member may be damaged so as to require replacement. Even if vibration characteristics permit the use of the detachable screw expedient, a lock washer is invariably necessary. Such lock washers tend to damage the surface of the structural member and are, therefore, undesirable.

In some cases, the nut or female receptacle is welded to the structural member. However, in many instances, either or both the nut and the structural member or surrounding parts cannot withstand the heat generated by welding. Even if cold weld or an adhesive is employed, the installation is essentially permanent. Should the female receptacle, nut or threads be damaged, the structural support usually must be cut away and a reinforcing gusset secured over the hole. At best, the weld must be broken, which is both time consuming and costly.

In most instances of prior art arrangements, the mount must be secured to a supporting structure by manipulation of the assembly from the side of the structure upon which it is mounted is impossible.

In its broad aspect, therefore, the invention proposes an improved utility mount assembly adapted to engage a cooperative supporting structure by means of a simple, non-threaded locking action.

Likewise, of general nature, the invention provides an improved utility mount assembly which positively yet detachably engages the supporting structure securing the mount against both displacement therefrom or rotation with respect thereto.

More specifically, it is among the objects and advantages of the present invention to provide a universal detachable utility mount assembly adapted for both blind and accessible installation in which the mount may be quickly, easily and detachably, yet flush-mounted, on a completely inaccessible or blind side of the supporting structure by manipulation from the opposite or accessible side.

Another object of the invention is to provide a universal detachable utility mount assembly for both blind and accessible installations, in which the assembly is passed through a relatively small hole in the supporting structure and detachably, yet positively, mounted on the opposite side solely by manipulation through the hole in the basal member of the structure.

Yet another object of the invention is to provide a universal detachable utility mount assembly for both blind and accessible installations in which the mount may be quickly and easily detached from one side of the supporting structure without damage thereto solely by manipulation from the opposite side of the structure.

Still another object of the invention is to provide a universal detachable utility mount assembly for both blind and accessible installations which will not accidentally detach due to high frequency vibration, fatigue, impact, or force.

A further object of the invention is to provide a universal detachable utility mount assembly which is structurally extremely strong, resistant to tension, compression, shear and torque stresses.

Yet a further object of the invention is to provide a universal detachable utility mount assembly for both blind and accessible installations which is detachable yet positively flush-mounted to a supporting structure without the use of rivets, screws, lock washers, pins, welds, adhesive or the like.

A still further object of the invention is to provide a universal detachable utility mount assembly for both blind and accessible installations which repeated attachment and detachment damages neither the mount assembly nor the supporting structure.

Still another object of the invention is to provide a universal detachable utility mount assembly for blind and accessible installations which may be either stationarily or floatably secured to the supporting structure.

Yet another object of the invention is to provide a universal detachable utility mount assembly for both blind and accessible installations which may be flush-mounted to extremely thin, extremely thick, or exceedingly hard supporting structure by means of an intermediate mounting plate.

Again, an object of the invention is to provide a universal detachable utility mount assembly for blind and accessible installations which is functionally sufficiently simple to manipulate in total darkness merely by means of tactile sensation.

These objects and advantages, as well as others, may be achieved by the present invention, embodiments of which are illustrated in the accompanying drawings, in which;

FIGURE 1 is a top plan view of a utility mount assembly secured to the blind side of a supporting structure, the mount being in the form of a nut or female receptacle adapted to threadably receive a bolt;

3,219,035

3

Figure 1:
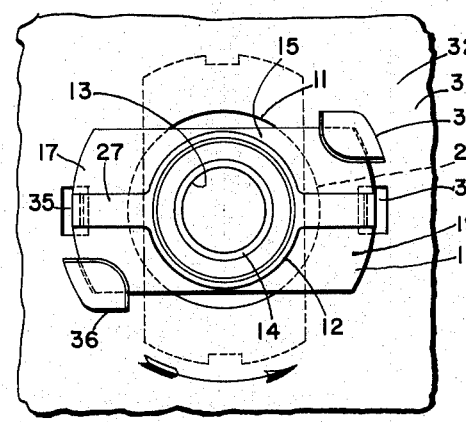
Figure 6:
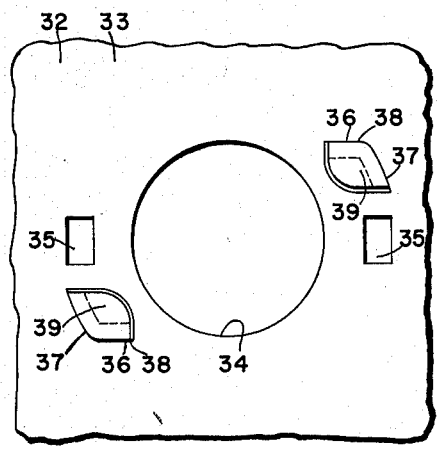
FIGURE 6 is a top plan view of the supporting structure shown in FIG. 1.
Figure 2:
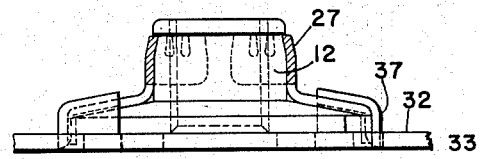
FIGURE 2 is a side elevational cross-sectional view of the mount assembly shown in FIG. 1.
Figure 7:
FIGURE 7 is a side elevational view of the supporting structure shown in FIG. 6.

Referring now to the drawings in detail, the utility mount assembly of the present invention comprises a utility mount designated in its entirety by numeral 11.

4

Figure 3:
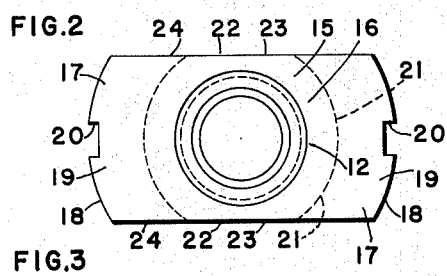
FIGURE 3 is a top plan view of the utility mount shown in FIG. 1.
Figure 4:
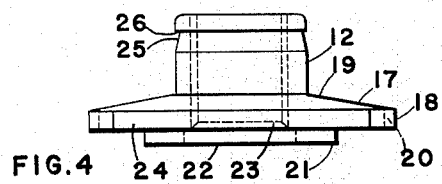
FIGURE 4 is a side elevational view of the utility mount shown in FIG. 1.

The mount 11 is shown, for instance in FIGS. 1–5, 19, 20 and 22, as including a generally cylindrical body portion or hub 12 with a bore 13 generally coaxial to the hub, the bore being provided with internal screw-threads 14. A radial flange 15 is a formed integrally with the hub 12 near its bottom. The radial flange 15 lies in a plane generally perpendicular to the axis of the hub 12 and is provided with a downwardly and outwardly inclined top surface 16. Formed integrally on the radial flange 15 is a pair of diametrically opposed radial arms 17, 17 having generally vertical opposed arcuate walls 18 at their remote ends. The under surfaces of arms 17, 17 lie in the plane of the under surface of flange 15; the top surfaces 19, 19 of said arms are downwardly and outwardly inclined, smoothly merging with the top surface 16 of the flange 15. The remote ends of said arms 17, 17 are constituted as said arcuate peripheral end walls 18, 18 at equal radial distances from the flange and hub axis, and each is provided with a generally vertical groove 20 which, in a radial direction, is U-shaped and outwardly open. The bottom of mount 11 is provided centrally with a downwardly protruding generally annular guide 21 located below the level of flange 15. In FIGS. 3 and 4, said guide 21 is provided with a pair of opposed, generally parallel and vertical, chordal flat side walls 22, 22, and flange 15 is also provided with a pair of opposed, parallel and vertical side walls 23, 23. The respective side walls 22, 22 of the guide 21 and side walls 23, 23 of the flange 15, smoothly merge and lie in the plane of the respective side walls 24, 24 of the radial arms 17, 17 which are also generally parallel and vertical. In FIGS. 19–22, the guide 21 is shown as completely circular since the flat side walls are not needed in that construction.

Giving attention for the moment to the showing on sheet 1 of the drawings, it will there be seen that an outer portion of the hub 12 of the mount 11 is provided with an upwardly and inwardly inclined truncated conical surface 25 abruptly terminating in an annular radial retaining lip 26 near the top of the hub. A lock 27 is mounted on the hub 12. The lock comprises a resilient, annular, split collar 28 having a plurality of resilient inwardly and upwardly inclined detaining staves 29 hugging the conical surface 25 of the hub. Integral with and projecting from the bottom of said split collar 28 are a pair of diametrically opposed, outwardly and downwardly inclined resilient legs 30, 30 each said leg terminating with a generally vertical depending toe 31 formed integrally therewith. To assemble, the annular split collar 28 is forced downwardly over the hub 12 of the mount 11 until the detaining staves 29 engage the retaining lip 26. The legs 30 of the lock 27 are dimensioned so that the depending toes 31 slide through the respective grooves 20, 20 in the arcuate peripheral end walls 18, 18 of the radial arms 17, 17. The depending toes 31, 31 are slightly longer than the height of the arcuate peripheral walls 18, 18, normally extending therebeneath, the legs 30, 30 of the lock 27 extending flush and in contact with the upper surfaces 19, 19 of the respective radial arms 17, 17 and the upper surface 16 of the flange 15.

Figures 19, 23:
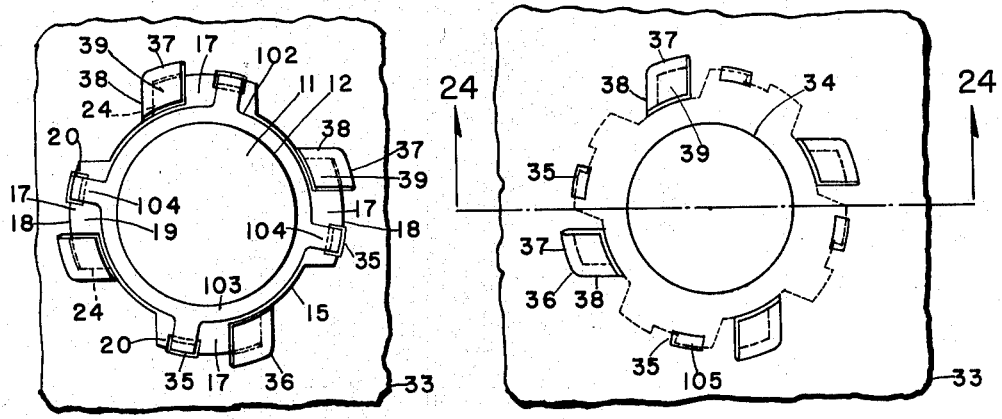
FIGURE 19 is a top plan view of a mount of a character analogous to the showing of FIG. 1, but for use where the location for the mount is fully accessible for manipulation in its application to or removal from the supporting structure.
FIGURE 23 is a top plan view of the cooperative supporting structure alone, its employment in the assembly being shown in FIG. 19.
Figure 24:
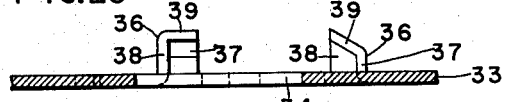
FIGURE 24 is a cross-sectional view of the said cooperative supporting structure, taken along line 24—24 of FIG. 23.
Figure 20:
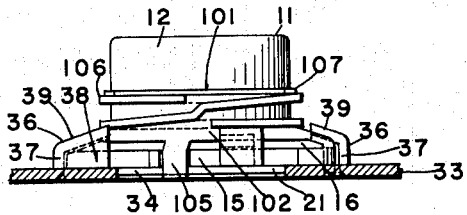
FIGURE 20 is a side elevational view of the assembly shown in FIG. 19, and with the basal member in cross-section.
Figure 25:
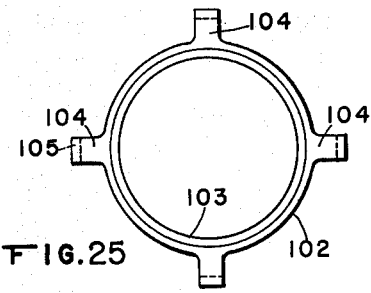
FIGURE 25 is a top plan view of a lock for the assembly.
Figure 21:
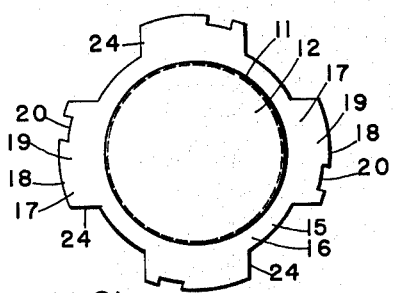
FIGURE 21 is a top plan view of the utility mount alone, which in FIGS. 19 and 20 is shown as part of the total assembly.
Figure 26:
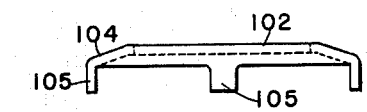
FIGURE 26 is a side elevational view of the lock of FIG. 25.
Figure 22:
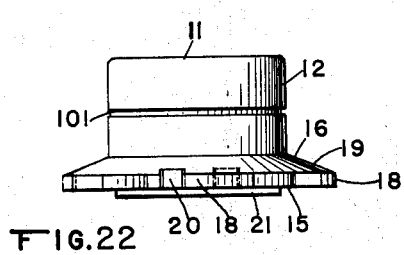
FIGURE 22 is a side elevational view of the mount shown in FIG. 21.

The novel utility mount above described is adapted for detachable engagement with a cooperative structure 32 such as shown in FIGURES 1, 2, 5, 6 and 7. The supporting structure as here shown comprises a generally flat basal member 33 which may be a panel or other element having a hole 34 therethrough. Correspondingly, FIGURES 19, 20 and 23 show a flat basal member 33 with hole 34 therethrough. In all of the mentioned figures, a pair of diametrically opposed generally rectangular openings or ports 35, 35 are provided on opposite sides of central hole 34. The ports 35, 35 are positioned and dimensioned to receive ends of aforementioned depending toes 31 of the respective legs 30, 30 on the lock 27. A pair of cooperative upstanding generally L-shaped pockets or covered retainers 36, 36 are formed from the basal member 33 on opposite sides of hole 34, diametrical to each other and adjacent to the rectangular openings or ports 35, 35. The retainer comprises an upstanding arcuate outer wall or riser 37 and an upstanding non-radial longitudinal wall or riser 38 transverse to and integral with said arcuate riser. A fixed top 39 is formed on the tops of risers 37, 38, extending generally inwardly toward hole 34. Said top 39 is inclined upwardly and inwardly toward the hole 34 at an angle comparable to the angle of inclination of the top surface 19 of the arms 17. The internal radius of the arcuate outer wall or riser 37 is slightly greater than the radius of the radial arm 17 measured from the axis of bore 13. The longitudinal riser 38 is positioned to bring the groove 20 in the arcuate end wall 18 of the radial arm 17 in registration with the rectangular opening or port 35 in the basal member or panel 33 when the side wall 24 of said arm is in abutment with said longitudinal riser 38 of the retainer 36.

In assembly, lock 27 is forced downwardly over the hub 12 of the mount 11 until lock legs 30 engage flatwise upon top surface 19 of flange 15 at an appropriately rotated position such that toes 31 of said legs depend within grooves 20 of the flange. Suitable means is provided in each form of the invention to retain the lock in place around the hub 12 and superposed on flange 15, and in FIGS. 1 and 2, such means comprises the above-described staves 29 which snap into detaining engagement under retaining lip 26 when the lock is slid home on the hub. The specific means employed in the construction of sheet 3 of the drawings will be described hereinafter. In any event, the utility mount 11 with its specific lock mounted thereon, constitutes an entity and as such is ready for attachment to the basal member or panel 33.

Figure 5:
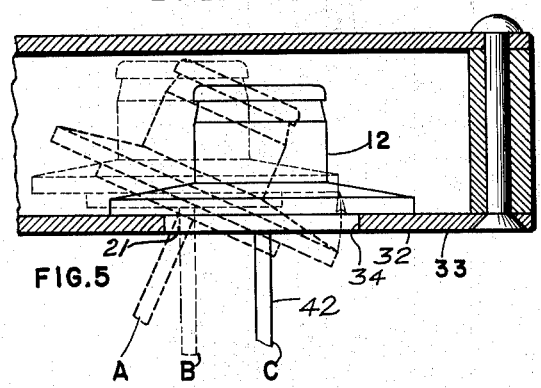
FIGURE 5 is a side elevational, partially cross-sectional, view of the utility mount shown in FIG. 1, in three positions assumed during attachment and detachment.
Figure 10:
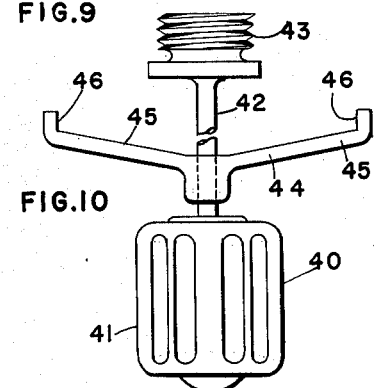
FIGURE 10 is a side elevational view of a tool employed to attach and detach the utility mount to and from the supporting structure.

A tool 40, shown in FIG. 10, is employed in a manner illustrated in FIG. 5, to insert and attach and detach the utility mount to the blind side of a basal member or panel 33. The tool 40 comprises a generally cylindrical handle 41 having a shaft 42 extending therefrom. A threaded bolt 43 is formed on the end of the shaft 42 opposite the handle 41. A yoke-like ram 44 is slidably mounted on shaft 42 between handle 41 and threaded bolt 43. The ram 44 comprises a pair of diametrical radial arms 45, 45 each having a generally vertical finger 46 formed on the outer end thereof. The arms 45 are dimensioned so that the fingers 46 will span the distance between the rectangular openings or ports 35, 35 of basal member or panel 33 and thereby adapted to be pushed upwardly therethrough.

For manipulating the utility mount 11 into and out of position at the blind side of basal member 33 the threaded bolt is screwed into the threads 14 in the bore 13 of said mount from the bottom thereof as is shown in FIG. 5. The tool 40 is then inclined at an angle to the plane of the basal member or panel 33 as is shown in dotted lines designated A in FIGURE 5. One radial arm 17 is then inserted through the hole 34 until the shaft 42 of the tool 40 engages the side of the hole. It should be noted that said hole 34 in the basal member 33 is slightly greater in diameter than the diametric distance between the side wall 24, 24 of the arms 17 (FIGS. 1–5) and the side walls 23, 23 of the flange 15 and the side walls 22, 22 of the guide 21, all of which, in this particular construction, are co-extensive, flat and generally parallel to the axis of the bore 13. The assembly is then oriented to be parallel to the panel or basal member 33 and now lies on the opposite or blind side thereof. When employing the tool 40 shown in FIGURE 10, the radial length of the arm 17 measured from the axis of the bore 13 of the mount 11, must be somewhat less than the diameter of the hole 34 so that once one arm 17 has been passed therethrough, the entire assembly may be rotated in the direction as is shown by the arrow in FIGURE 5 to assume the position shown in dotted line B. Thus the entire assembly mount has been inserted through the hole 34 in the basal member 33.

The assembly is next pulled downwardly against the basal member 33 to assume the position C, shown in solid lines in FIGURE 5 whereupon the shaft 42 is perpendicular to and coaxial with hole 34, and the guide 21 at the bottom of the mount 11 is seated within the hole 34, effectively centering the assembly. The arms 17, 17 are oriented in a direction generally perpendicular to a line extending between the rectangular openings or ports 35, 35 in the panel or basal member 33 as is shown in dotted lines in FIGURE 1. The toes 31, 31 of the lock 27 normally extend to a level lower than the bottom of the radial arms 17, 17. Thus as the tool 40 is pulled downwardly away from the panel or basal member 33, the toes 31, 31 will engage the surface of said panel. The radial legs 30, 30 on the lock 27 in the construction shown on sheet 1, are resilient and thus flex upwardly as the tool 40 is pulled downwardly out and away from the panel 33. The tool 40 is then rotated in a clockwise direction as indicated by the arrow in FIGURE 1 while pull is maintained downwardly and outwardly away from the panel 33 by means of the tool 40, thus maintaining the resilient legs 30, 30 in a state of flex.

In all showings herein, when the grooves 20, for example, in the arms 17 are in registration with the rectangular openings or ports 35 in the panel or basal member 33, the resilience applied by legs 30 to the toes 31, will cause said toes to snap downwardly, seating within said ports. In this position, the diagonal corners of the arms 17 will lie within the pocket retainers 36, the top surface 19 of the arms 17 lying in detained abutment under the tops 39 of said retainers. The said retainers are so dimensioned that there is a snug slidable engagement between the top surface 19 of arm 17 and the under face of the respective retainer top 39. The depending toes 31 on the lock 27 seated within the rectangular openings or ports 35 in basal member or panel 33 prevent rotation of the entire assembly which, if it occurred, would disengage the arms 17 from beneath the upstanding pocket retainers 36. Location of the toes 31 each in a groove 20 and in a port 35 interlocks the utility mount 11 against rotation, and location of arms 17 in the pocket retainers 36 prevents axial displacement of the mount 11, as a result of which the assembly is secured releasably in fixed position for use.

It should be noted that the guide 21 on the bottom of the mount 11 could be either made substantially smaller than the hole 34 in panel 33 or be dispensed with entirely. At the same time, ports 35 and retainers 36 could be made quite large and thus provide a floating installation for the assembly. Nevertheless, though the assembly could move to-and-fro for a limited distance, the arms 17 could never become inadvertently disengaged from beneath the upstanding and overlapping retainers 36.

Figure 11:
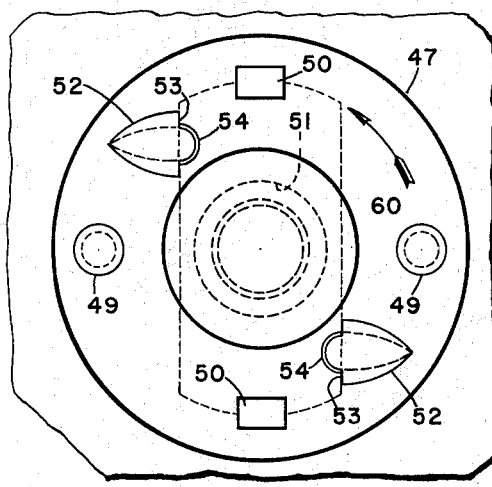
FIGURE 11 is a top plan view of a utility mount according to the present invention and shown attached to an intermediate mounting plate.
Figure 12:
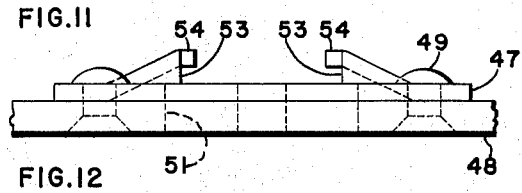
FIGURE 12 is a side elevational view of the intermediate mounting plate shown in FIG. 11, and showing the same attached to a basal member of a supporting structure.

An alternative structure is shown in FIGURES 11 and 12, wherein an intermediate mounting plate 47 is employed. Intermediate mounting plate 47 is generally circular in configuration although it may be rectangular or any other convenient shape, and is generally flat. Said mounting plate 47 is permanently secured to the basal member or panel 48 by means of rivets 49, or by an adhesive compound, or otherwise. The said intermediate mounting plate 47 is employed when the basal member or panel, here designated by numeral 48, is unsuitable for perforations or forming or is of such a character that it cannot easily be machined. One such instance would be when the basal member is glass or is a material of extreme hardness.

Intermediate mounting plate 47 is provided with a pair of diametrically opposed generally rectangular openings or ports 50 on opposite sides of a hole 51. A pair of upstanding retainers 52 are provided diametrical to hole 51 and generally adjacent to the rectangular openings or ports 50. The retainers 52 are each provided with an outwardly extending nonradial longitudinal riser wall 53 and an overhanging generally horizontal lip or wall 54 extending generally perpendicular to the riser 53. The retainers 52 and ports 50 have the same functions and the same relative positions as the retainers 36 and ports 35 shown in FIGURES 1 and 6. The alternative structure shown in FIGURES 11 and 12 functions in a manner identical to the structure shown in FIGURE 1.

Figure 18:
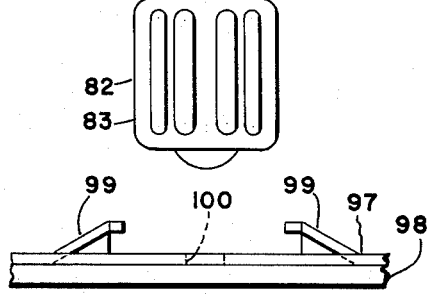
FIGURE 18 is a side elevational view of an alternative intermediate supporting structure.

FIGURE 18 shows an alternative intermediate mounting plate 97 which is mounted on a basal member 98 by means of an adhesive, mastic or cold weld. The intermediate plate 97 is provided with a pair of upstanding retainers 99 identical to retainers 52 in FIGURES 11 and 12. In addition, there are ports 100 which are identical to ports 50 in FIGURES 11 and 12. The plate 97 is identical to plate 47 excepting that the opening or hole in the center of the plate is blind, terminating at or closed by the basal member 98. Or, in the alternative, no hole or opening need be provided at all.

Figure 8:
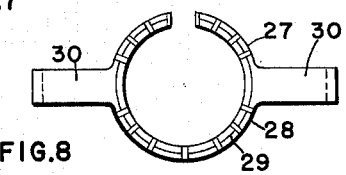
FIGURE 8 is a top plan view of a resilient lock adapted to secure the mount against rotation.
Figure 9:
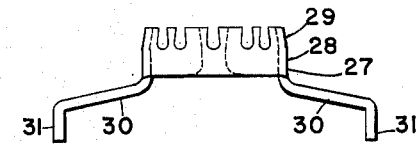
FIGURE 9 is a side elevational view of the lock shown in FIG. 8.
Figure 13:
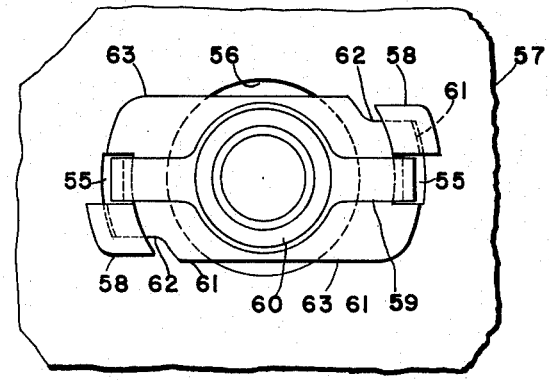
FIGURE 13 is a top plan view of an alternative utility mount assembly detachably secured to an alternative supporting structure or basal member.
Figure 14:
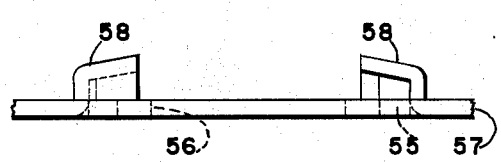
FIGURE 14 is a side elevational view of the alternative supporting structure shown in FIG. 13.

A still further alternative structure is shown in FIGURES 13 and 14. In some instances, it may be desirable to provide ports in the basal member or panel and form retainers in the same general location. Therefore, in FIGURE 13 a pair of diametrically opposed generally rectangular openings or ports 55 are shown on opposite sides of the hole 56 in a basal member or panel 57. A pair of diametrically opposed upstanding retainers 58 are formed immediately adjacent to the openings or ports 55 from material cut out and formed therefrom. In this instance, the lock 59 is identical to lock 27 shown in FIGURES 8 and 9 as is the utility mount 60 identical to utility mount 11. However, the radial arms 61 on the utility mount 60 are provided with a pair of diagonally opposed corner recesses 62 in their side walls 63 at the arcuate ends thereof. The upstanding retainers 58 are identical in shape and function to the upstanding retainers 36 shown in FIGURES 1 and 6. The recesses 62 are adapted to minimize the size of the rectangular openings or ports 55.

In FIGURES 1 through 14 and also 19 through 26, there are shown utility mount assemblies wherein the mount is in the form of a nut or female receptacle having a generally cylindrical body which does not project through the hole on the basal member or supporting structure. However, in FIGURES 15 and 16, a utility mount assembly is shown wherein the mount is in the form of a bolt which projects through the hole in the basal member. The bolt 65 comprises a partially threaded shank 66 and a generally circular head 67 although the shank may be fully threaded. Formed on the circular head 67 is a pair of diametrically opposed radial arms 68 which may be somewhat less thick than the circular head 67. The arms 68 may be provided with an outwardly and downwardly inclined upper surface 69, although the same is not essential in this instance. The remote ends of said radial arms 68 are generally formed as vertical arcuate peripheral walls 70 each of which has a vertical U-shaped groove 71 therein. A resilient lock 72 is mounted on the head 67 of the bolt 65 by means of a screw 73. The lock comprises a generally circular central section having a passage therein to accommodate the screw and a pair of diametrically opposed resilient radial legs 74. The legs 74 are outwardly and downwardly inclined and are each provided with a generally vertical depending locking toe 75. The locking toes 75 and legs 74 are so dimensioned that each projects downwardly through the respective groove 71 in the arcuate wall 70 of the radial arm 68 extending therebeneath.

The structural support or basal member 76 is provided with a hole 77 to accommodate the head 67 of the bolt 65. The hole 77 communicates with a pair of diametrically opposed openings 78 having the same shape as the radial arms 68 of the bolt 65 but of slightly larger dimensions. The basal member 76 is provided with a pair of upstanding retainers 79 diagonally opposed to each other and on opposite sides of the bolt 77. The retainers 79 are identical in structure and function to the retainers 52 in FIGURE 11. In addition, basal member or panel 76 is provided with a pair of diametrically opposed generally rectangular openings or ports 80 on opposite sides of the hole 77 which function as the rectangular openings or ports 50 in FIGURE 11.

Figure 15:
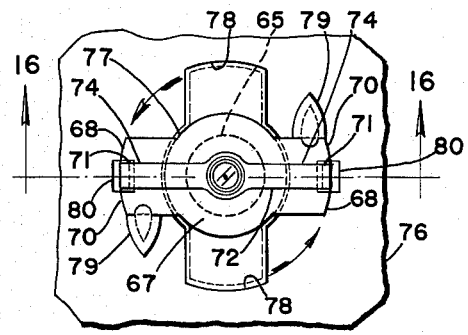
FIGURE 15 is a top plan view of a utility mount assembly secured to the blind side of a supporting structure, the mount being in the form of a bolt adapted to threadably engage a nut or female receptacle.
Figure 16:
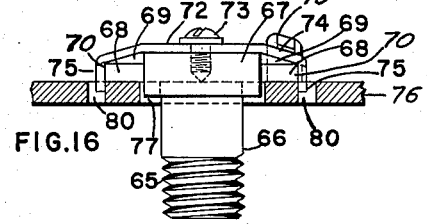
FIGURE 16 is a side elevational, partially cross-sectional view on line 16—16 of the utility mount assembly shown in FIG. 15.

In operation, the bolt 65 is passed head first through the hole 77 in the basal member or panel 76, the radial arms 68 passing through the openings 78 as shown in dotted lines in FIGURE 15. Thereafter, the shank 66 is rotated clockwise. As the arms 68 pass over the surface of the basal member or panel 76, the shank 66 of the bolt 65 is pulled downwardly away from the panel 76 so that the toes 75 of the lock 72 are resiliently flexed upwardly by engagement with the surface of the panel or basal member 76. The radial arms 68 will then engage the retainers 79, snugly sliding beneath the overhanging wall or lip 81 thereof. In this position, the grooves 71 in the arms 68 will be in registration with the rectangular openings or ports 80 in the panel 76 and the toes 75 of the lock 72 will snap downwardly seating therein. Thus, the bolt is flush-mounted detachably yet positively to the basal member or panel 76 and cannot be accidentally or inadvertently rotated in any direction which would free the arms 68 of the bolt 65 from beneath retainer 79.

Figure 17:
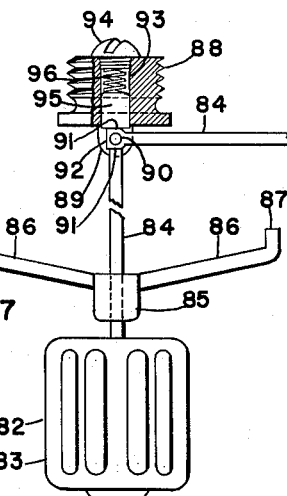
FIGURE 17 is a side elevational, partially cross-sectional view of an alternative tool adapted to be used to attach and detach the utility mount by transition of the mount through an opening in the supporting structure basal member at right angles to the plane of said basal member when the installation is to be at the blind side of said member.

An alternative tool 82 is shown in FIGURE 17. The tool comprises a handle 83 having a shaft 84 extending therefrom. A yoke-like ram 85 is slidably mounted on the shaft 84. Said ram 85 is provided with a pair of diametrically opposed radial arms 86 each having a generally vertical upstanding finger 87. The function of the ram 85 is identical to the function of the ram 44 shown in FIGURE 10. The end of the shaft 84 opposite the handle 83 is pivotally engaged to a threaded bolt 88. The top of the bolt 88 is provided with a pair of upstanding, generally parallel mounting ears 89, 89. The end of the shaft 84 extends therebetween and is pivotally mounted thereto by means of a pin 90. It should be noted that the opposed sides 91 of the end of the shaft 84 are flat and generally parallel and perpendicular to the flat terminal end 92 of the shaft 84. The bolt 88 is provided with a transverse, axial, generally cylindrical bore 93 internally threaded at the end opposite the shaft 84. A machine screw 94 is threadably engaged to the internal threads in the bore 93 closing the bore.

A piston 95 is slidably mounted in the passage 93 with a resilient coil spring 96 extending between the top end of the piston and the bottom of the screw 94. The bottom end of the piston 95 is adapted to resiliently engage the shaft 84. In operation, the bolt 88 is threadably engaged with the bottom of the female receptacle or nut, in the case of FIGURES 1–5, utility mount 11, and in the case of FIGURES 11 and 13, utility mount 60. The utility mount is then pivoted about the pin joint 90 until one side 91 of the shaft 84 compressively engages the bottom of the piston 95. The resilience of the spring 96 normally urging the piston 95 outwardly maintains the mount at right angles to the shaft 84 of the tool 82. The assembly is then passed through the opening in the basal member or supporting panel as hereinbefore described, with the axis of the mount parallel to the panel and the shaft 84 perpendicular to the panel. This is particularly useful when the radial length of arm 17 or 61 of mount 11 or 60 is greater than the diameter of the hole in the panel or basal member but the depth of the mount is slightly less than the said diameter. In such cases, the mount can only be passed through the hole in the panel when the axis of the mount is substantially parallel to the panel and the shaft 84 of tool 82 is perpendicular thereto. Once the assembly has traversed the opening in the panel, a portion of it may be engaged on the inside blind surface of the panel or basal member to pivot the mount about the pin 90 returning the shaft 84 to a position generally coaxial to the mount. Thereafter the mount is secured to the panel in the manner hereinabove described.

Referring now more extensively to sheet 3 of the drawings, the mount there shown, not being intended for blind mounting, may conveniently provide more radial arms 17 than in the disclosure of sheet 1, since they remain on the accessible side of basal member 33. In the construction of sheet 3, there are shown, by way of example, four such arms equally spaced angularly about the flange at 90° intervals and all of equal size and configuration. Similarly, each of the grooves 20 in the respective arms 13 are preferably of equal size and are equally spaced from each other angularly about the body or hub 12 by 90° intervals. However, each groove 20 is preferably offset to one side of the transverse axis of the arm 17 so that the arcuate peripheral wall 18 is longer on one side of the groove 20 than on the other side thereof. The groove 20 is spaced in the manner aforesaid in order that the separation between a port 35 as above described in the supporting basal member 33 and the perforation left by forming the retainers 36, also described above, is minimized, thereby avoiding undesirable weakness in the basal member. In this instance, there are four retainers 36 positioned radially about a circle the center of which is coincident with the center of hole 34, the retainers having angular spacing from each other of 90° intervals and properly located to receive advancing corners of radial arms 17 which approach the retainers during locking rotation of the mount.

The supporting structure or basal member 33 of the modification of sheet 3 is also provided with four of the generally rectangular openings or ports 35, and these are positioned about a circle concentric with hole 34 and angularly equally spaced from each other by 90° to conform to the arbitrarily selected example. The respective ports 35 are dimensioned and positioned to lie in registration with the equal number of grooves 20 on the respective arms 17 when the said arms are positioned in the four said pocket receptacles 36.

The hub 12 of the mount 11 in the showing of sheet 3 is provided with an annular external groove 101 considerably above flange 15. A lock 102 having an annular central portion 103 is slidably passed downwardly on said hub to a position well below said groove 101. Said lock 102 is provided with four outwardly and downwardly inclined latch legs 104 spaced from each other by 90° intervals. The angle of inclination of each latch leg 104 is approximately equal to the angle of inclination of the top surface 16 of the annular flange 15. A downwardly depending toe 105 is formed on the end of each said latch leg 104, the toes being rectangular in cross-section and adapted to seat within the grooves 20 on the flange arms 13 and to extend downwardly to further seat within the respective ports 35 in the basal member 33 when the grooves are in registration therewith. A means is provided to resiliently introduce said toes 105 into the ports 35 and to maintain them therein. The means in this instance comprises a coil spring 106 girdling the hub and disposed under pressure between the top of said annular central portion 103 of the lock 102 and the under side of a split ring 107 snapped into said annular external groove 102 after introduction of the lock and spring on the hub.

When the mount presently being described is applied to the basal member in use, it is pressed downwardly thereagainst causing the toes 105 to retract from their normal condition of protrusion below the flange; the annular guide 21 enters the basal member hole 34, and the operator then rotates the mount in a direction to introduce the flange arms 17 into the retainer pockets 36 resulting in the flange-arm grooves 20 coming into registration with basal-member ports 35 whereupon the toes 105 snap into said ports. As said toes are located both in the grooves 20 and in the ports 35, the mount is locked against rotation, and since the arms 17 are in the retainer pockets and unable to rotate out of those pockets, separation of the mount from the basal member is effectively prevented.

Release of the mount from the basal member may be accomplished by use of a suitable tool (not shown) similar to the one shown in FIGURE 10 and equipped with pushers 46 in appropriate number and location to unseat all of the toes 105 from the ports of the basal member.

I claim:

1. A utility mount assembly comprising a basal member having an article-receiving opening and a pair of ports diametrical to and beyond said opening, a pair of retainers on the basal member diametrical to and beyond said opening, each said retainer having an arcuate riser the center of curvature whereof is substantially coincident with the axis of the opening and a second riser transverse to said arcuate riser and a top wall integral with both said risers, an article adapted for mounting on said basal member, a pair of diametrically opposed radial arms on the article spanning lengthwise a distance greater than said opening and having arcuate ends the radii whereof of substantially that of the arcuate risers, said article and its arms having a width less than the diameter of said opening whereby the article may be passed through said opening in a direction longitudinally of the arms and then rotated against said basal member revolving said arms with the arcuate ends thereof proximate to the arcuate risers and the advancing edges of the arms into lengthwise engagement each with the full length of the second said riser of the respective retainer, a lock on said article adapted to simultaneously interlock with said arms and seat within said ports when the arms are positively engaged under said retainers, thereby positively securing said article against both displacement away from said basal member and against rotation with respect thereto, and said article having means engageable in said article-receiving opening thereby maintaining rotatable positioning of the article substantially coaxial to said opening.

2. A utility mount assembly in accordance with claim 1, wherein the outer ends of said arms are arcuate, and where in said retainers each provides an L-shaped pocket, said outer riser wall arcuately conforming to the said arcuate outer end of the respective arm, and each second riser wall transverse to said arcuate riser wall being integral therewith thereby providing two closed sides and two open sides for each retainer, the top surfaces of said arms and under surfaces of said retainer top walls being correspondingly inclined for engagement with each other.

3. A utility mount assembly comprising a basal member of predetermined thickness with a flat surface, said member at said surface having a circular opening and having ports spaced in their entirety radially outwardly beyond and away from said opening, a body juxtaposed on said surface, said body having an axis which in use coincides with the axis of said circular opening, said body thereby having a position axially perpendicular to and projecting from said basal member only from said flat surface in a single direction, at least two radial arms on said body located above said surface, each said arm extending to distance greater than the radius of said opening and extending beyond said opening as far as a respective said port, each arm having a groove at an outer end thereof entirely beyond said opening and spaced from said axis as far as the respective port, said grooves being longitudinally parallel to said axis and located in said ends of said arms, a cooperative upstanding pocket retainer on the basal member for each of said radial arms, said retainers projecting at the same said surface as said body, said retainer having a top spaced above said basal member surface, each retainer and a respective arm adapted to be simultaneously in interengagement, each arm being revolved into engagement with its respective retainer under said top thereof upon rotation of the said body on its axis, thereby securing the body against disengagement in an axial direction from said flat surface of the basal member, a lock mounted on said body at a location above said surface of the basal member, a cooperative radial leg on the lock for and above each said arm of the body, each leg extending to the end of a respective arm, a depending toe on each leg of the lock parallel to said axis slidably seated within a respective said groove on the arm proximate to the respective leg and having a predetermined length to provide a lower end lying entirely in a respective said port and within the thickness of the basal member when the said retainers and arms are in registration, said length of said toes being proportioned to avoid protrusion thereof through said member, thereby securing the body member against rotating with respect to the basal member, and said toes having resilient pressure applied thereto in a direction parallel to the axis by said legs urging the toes normally in an axial direction toward the basal member into said ports, said ports, grooves and toes being substantially of equal width to each other and the toes being transversely rigid for the entire width thereof and engaging at opposite sides thereof with the sides of the respective grooves and ports, the said body and lock having projection from said basal member in a single direction.

4. A utility mount assembly, comprising a structure in accordance with claim 3, wherein each said retainer on the basal member has a generally vertical riser in opposition to the side of the respective radial arm on the body as the body is coaxially rotated in respect to said opening, and the said riser having a spacing from said port corresponding to spacing of said groove from the said side of the respective radial arm.

5. A utility mount assembly, comprising a structure in accordance with claim 3, wherein the groove in each radial arm is spaced in its entirety in direction of rotation of said body from the side of the arm toward which the arm approaches when rotating into cooperative engagement with said upstanding retainer.

6. A utility mount assembly, comprising a structure in accordance with claim 3, wherein said arms are resilient in an axial direction and rigid in a direction rotative to the axis and under axial deflection provide said resilient pressure applied to said toes.

7. A utility mount assembly, comprising a structure in accordance with claim 3, wherein a spring is mounted on and girdles said body and means is provided preventing displacement of said spring longitudinally upward off of said body, said lock having an annular rigid central portion girdling said body with said toes rigid with respect to said annular portion of the lock, said annular portion underlying said spring and axially pressed thereby toward said basal member and thereby retaining said toes in said ports with a resilient pressure.

8. A utility mount assembly, comprising a structure in accordance with claim 3, wherein said retainers and ports provided by the basal member are in direction of rotation of the body successively located with respect to and spaced from each other and wherein each retainer has a riser in the path of rotation of said arms, and said arms make contact with and are stopped by a single riser for each retainer against only a corresponding single side of the respective arm next to said retainer.

9. A utility mount assembly, comprising a structure in accordance with claim 3, wherein said body has a flange next to and of greater diameter than said opening and engaging at its under side against the margin of the basal member around said opening, and said flange sloping outwardly at its upper side and having said arms projecting from its periphery and integral therewith, and said lock has a taper cooperating with said slope of the flange.

10. A utility mount assembly, comprising a structure in accordance with claim 3, wherein the under face of said top of the upstanding pocket retainer slidably receives the upper surface of a respective said arm thereagainst upon revolving said arms into engagement with said retainers, said body having a circular embossment engageable in said opening and enforcing rotation axially of said body and obtaining simultaneous slidable engagement of both of said arms with their respective retainers.

11. A utility mount assembly comprising a basal member having a circular opening and a flat surface annularly continuous around said opening and having retainers overlying said surface in part in offset relation thereabove, said member having ports diametric to but spaced outwardly from said opening, a receptacle having an axis adapted to coincide with the axis of said basal member opening and having an annular guide adapted to rotatably seat in said opening for coaxial rotation of the guide in said opening, said receptacle having grooves at its periphery, said grooves extending in directions parallel to the receptacle axis and located to register with said ports in the basal member, said receptacle having a planar area making flatwise engagement with said flat annularly continuous surface of said basal member and having protuberants received under said retainers when said annular guide seats in said member circular opening and the receptacle rotated, said retainers thereby preventing lifting displacement of the receptacle from said basal member, and a lock positively interconnected to said receptacle, said lock and receptacle constituting a unit separable in its entirety as such from the basal member, said lock having a single toe for each port substantially perpendicular to said flat surface of the receptacle situated longitudinally movable in said grooves and normally resiliently depressed to enter and project below said planar area of the receptacle and enter and interengage with said ports of the basal member, said toes thereby interengaging with both said receptacle and basal member and positively preventing rotation of both the lock and receptacle with respect to the basal member.

References Cited by the Examiner

UNITED STATES PATENTS

| 1,768,505 | 6/1930 | Carr | 85—80 |
| 1,800,176 | 4/1931 | Carr | 85—80 |
| 1,985,333 | 12/1934 | Wiley | 151—41.75 |
| 2,144,553 | 1/1939 | Simmonds | 151—41.76 |
| 2,381,233 | 8/1945 | Summers | 151—41.71 |
| 2,513,037 | 6/1950 | McLaughlin | 151—41.75 |

FOREIGN PATENTS

| 729,521 | 12/1942 | Germany. |
| 658,776 | 10/1951 | Great Britain. |

CARL W. TOMLIN, *Primary Examiner.*

EDWARD C. ALLEN, *Examiner.*